US008371941B2

(12) United States Patent
Varadarajan et al.

(10) Patent No.: US 8,371,941 B2
(45) Date of Patent: Feb. 12, 2013

(54) SYSTEM AND METHOD FOR GAME STATE REDUCTION

(75) Inventors: Sridhar Varadarajan, Bangalore (IN); Amit Thawani, Bangalore (IN)

(73) Assignee: SRM Institute of Science and Technology, West Mambalam (IN)

( * ) Notice: Subject to any disclaimer, the term of this patent is extended or adjusted under 35 U.S.C. 154(b) by 69 days.

(21) Appl. No.: 13/048,050

(22) Filed: Mar. 15, 2011

(65) Prior Publication Data

US 2012/0142423 A1 Jun. 7, 2012

(30) Foreign Application Priority Data

Dec. 6, 2010 (IN) .......................... 3672/CHE/2010

(51) Int. Cl.
*G06F 17/00* (2006.01)
(52) U.S. Cl. ........................................................ 463/42
(58) Field of Classification Search .............. 463/20–25, 463/29, 40–42
See application file for complete search history.

(56) References Cited

U.S. PATENT DOCUMENTS

| 6,749,514 | B1 | 6/2004 | Moriwaki et al. |
| 6,758,757 | B2 | 7/2004 | Luciano, Jr. et al. |
| 7,280,700 | B2 | 10/2007 | Tourapis et al. |
| 7,574,493 | B2 | 8/2009 | Hutcheson et al. |
| 8,187,089 | B2* | 5/2012 | Englman et al. ............... 463/25 |
| 8,192,289 | B2* | 6/2012 | Herrmann et al. ............... 463/42 |
| 2011/0077386 | A1* | 3/2011 | Lee et al. ..................... 536/17.9 |
| 2011/0078377 | A1* | 3/2011 | Grube et al. ................... 711/118 |

OTHER PUBLICATIONS

Paul Beskow et al.; "The Partial Migration of Game State and Dynamic Server Selection to Reduce Latency", Multimedia Tools and Applications, vol. 45, Issue 1-3 (Oct. 2009).
Marco Salles et al.; "An Evaluation of Checkpoint Recovery for Massively Multiplayer Online Games", appeared in the Proceedings of VLDB Endow., vol. 2, No. 1 (2009).
Ferad Zyulkayarov et al.; "Atomic Quake: Using Transactional Memory in an Interactive Multiplayher Game Server"; appeared in the Proceedings of the 14th ACM SIGPLAN Symposium on Principles and Practice of Parallel Programming (PPoPP), Feb. 2009.
Kaiwen Zhang et al.; "Persistence in Massively Multiplayer Online Games"; appeared in the Proceedings of the 7th ACM SIGCOMM Workshop on Network and System Support for Games (2008).
K. Prasetya et al.; "Performance Analysis of Game World Partitioning Methods for Multiplayer Mobile Gaming"; appeared in the Proceedings of the 7th ACM SIGCOMM Workshop on Network and System Support for Games (2008).

* cited by examiner

*Primary Examiner* — Ronald Laneau
(74) *Attorney, Agent, or Firm* — Merek, Blackmon & Voorhees, LLC

(57) ABSTRACT

Massively multiplayer network games are fast becoming prevalent all over Internet. Servers that support such network games demand huge computing and storage infrastructure. Storage associated with game servers store game related information as well game-instance related information. Game states provide all the information about a game being played and storing them provides an opportunity to continue the game after a pause. An effective representation of game states allows for reduced demand on the storage. An efficient approach for archiving of game states is discussed.

11 Claims, 12 Drawing Sheets

A Typical Gaming System

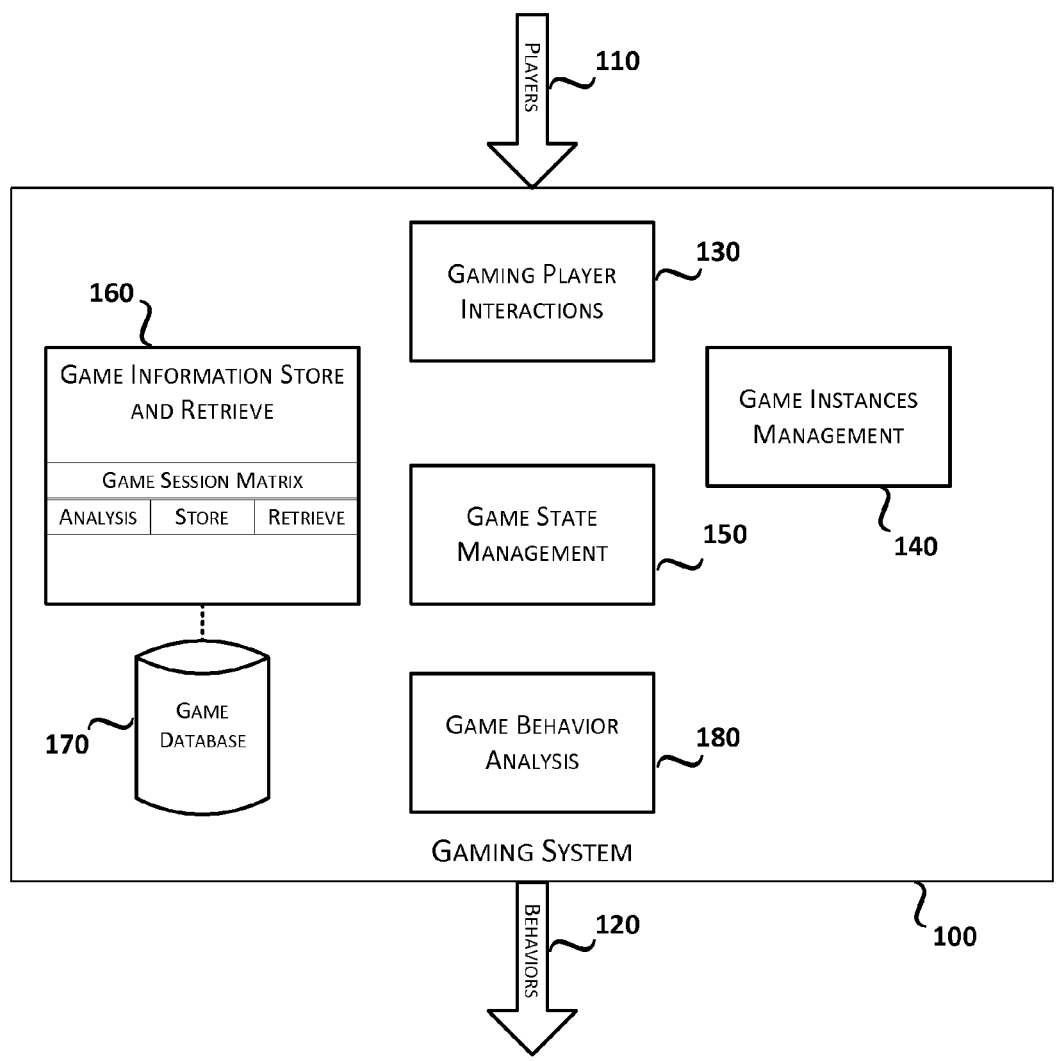
FIG. 1: A TYPICAL GAMING SYSTEM

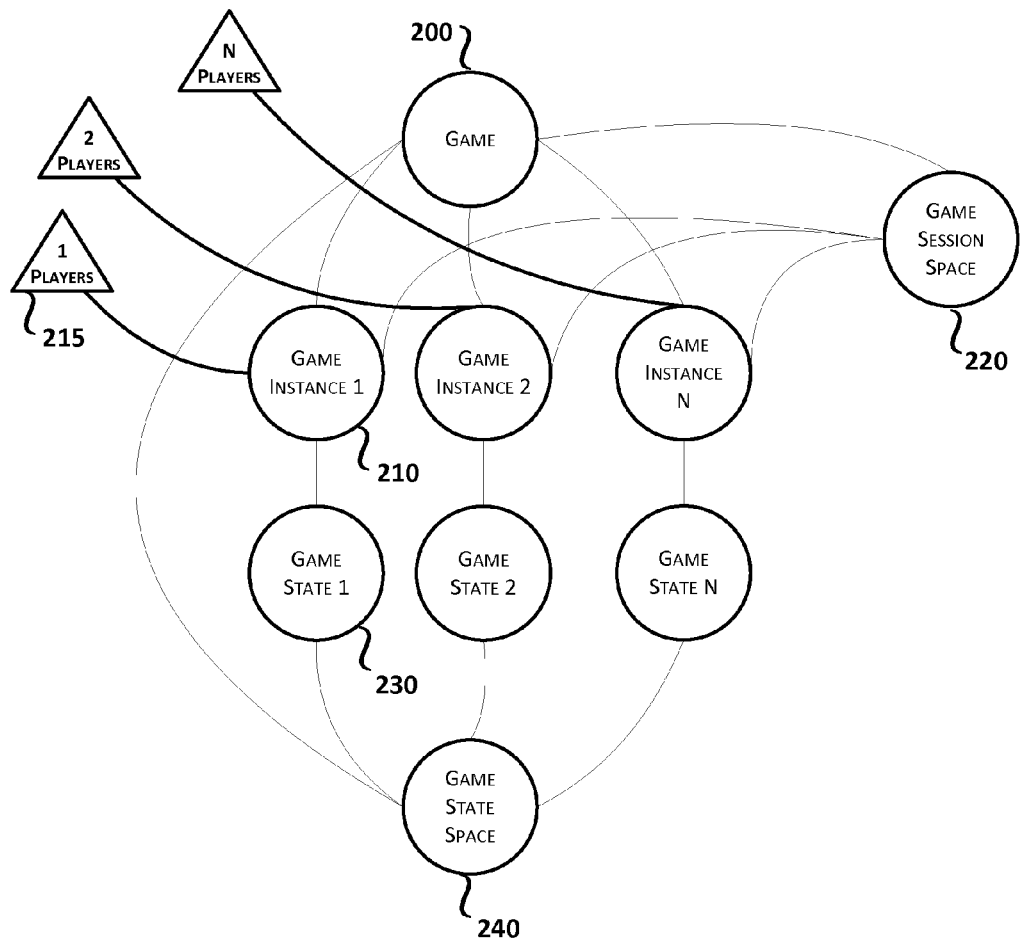
FIG. 2: ILLUSTRATION OF GAME INSTANCES AND STATES

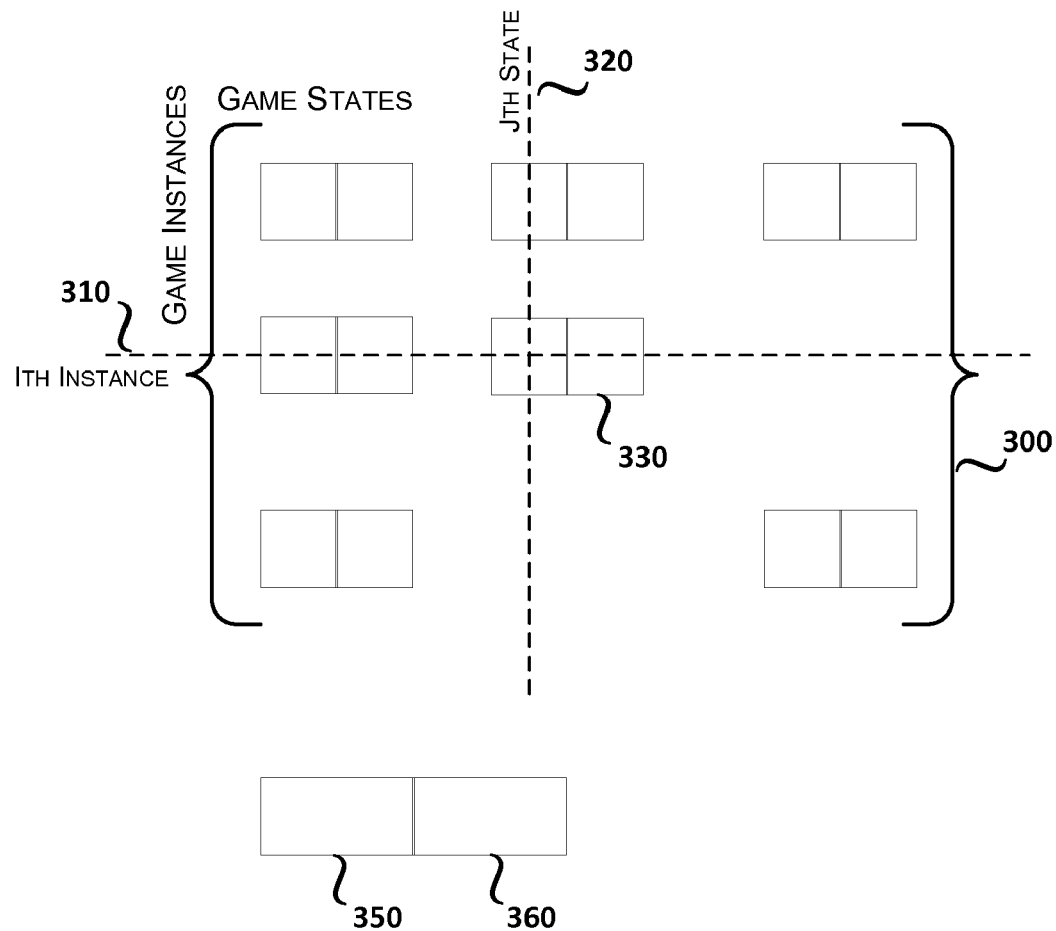
FIG. 3: ILLUSTRATION OF GAME SESSION MATRIX

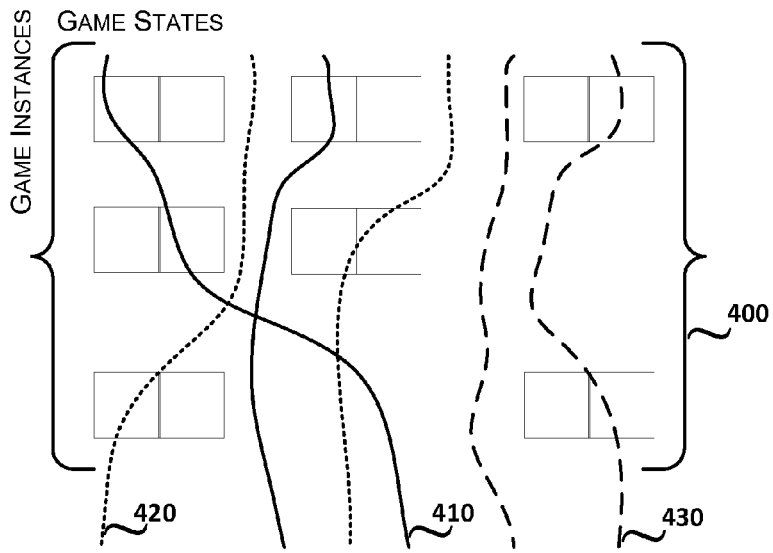

FIG. 4: ILLUSTRATIVE STATE CHAINS

DIFFERENT KINDS OF CHAINS:

A CHAIN IS A SEQUENCE OF ELEMENTS OF A GAME SESSION MATRIX, WHEREIN THE ELEMENTS SATISFY CERTAIN COMMON ONE OR MORE PROPERTIES.

NOTE:
EACH ELEMENT IS REPRESENTED AS A BYTE SEQUENCE.
EACH CHAIN HAS A SEED ELEMENT THAT FORMS THE BASIS FOR THE CHAIN.
A CHAIN IS FORMED ONLY IF THE REDUCTION FACTOR ASSOCIATED WITH THE CHAIN EXCEEDS A PRE-DEFINED THRESHOLD.
REDUCTION FACTOR IS DEFINED AS THE AMOUNT OF REDUCTION ACHIEVED BY A CHAIN REPRESENTATION OF A SET OF SEQUENCE OF BYTES.

EQUALITY CHAINS (EQCS) (410): AN EQUALITY CHAIN IS A CHAIN IN WHICH THE ELEMENTS OF THE CHAIN ARE PRECISELY EQUAL.

NEAR EQUALITY CHAINS (NECS) (420): A NEAR EQUALITY CHAIN IS A CHAIN IN WHICH THE ELEMENTS OF THE CHAIN ARE NOT SO PRECISELY EQUAL. THAT IS, THE ELEMENTS ARE "SIMILAR" TO THE SEED ELEMENT BASED ON A PRE-DEFINED SIMILARITY MEASURE.

RANDOM OPERATOR BASED EQUALITY CHAINS (RECS) (430): A RANDOM OPERATOR BASED EQUALITY CHAIN IS A CHAIN IN WHICH THE ELEMENTS BECOME EQUAL UPON APPLYING OF A RANDOM OPERATOR ON THE SEED ELEMENT.
TYPICAL EXAMPLES OF RANDOM OPERATOR ARE SWAP (X), ADD (A), AND SUBTRACT (S).

FIG. 4A: DIFFERENT KINDS OF CHAINS

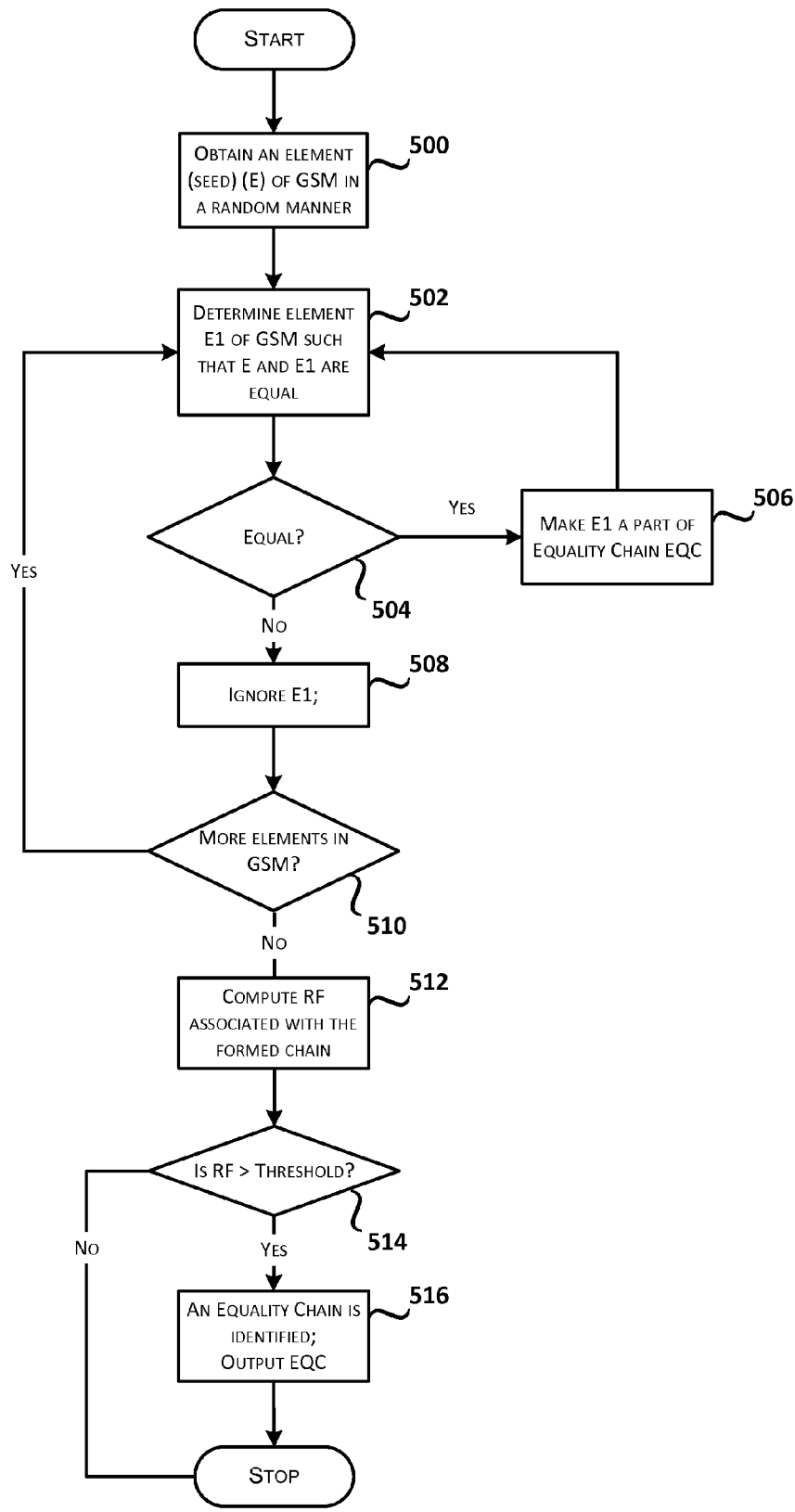
FIG. 5: IDENTIFYING EQUALITY CHAINS

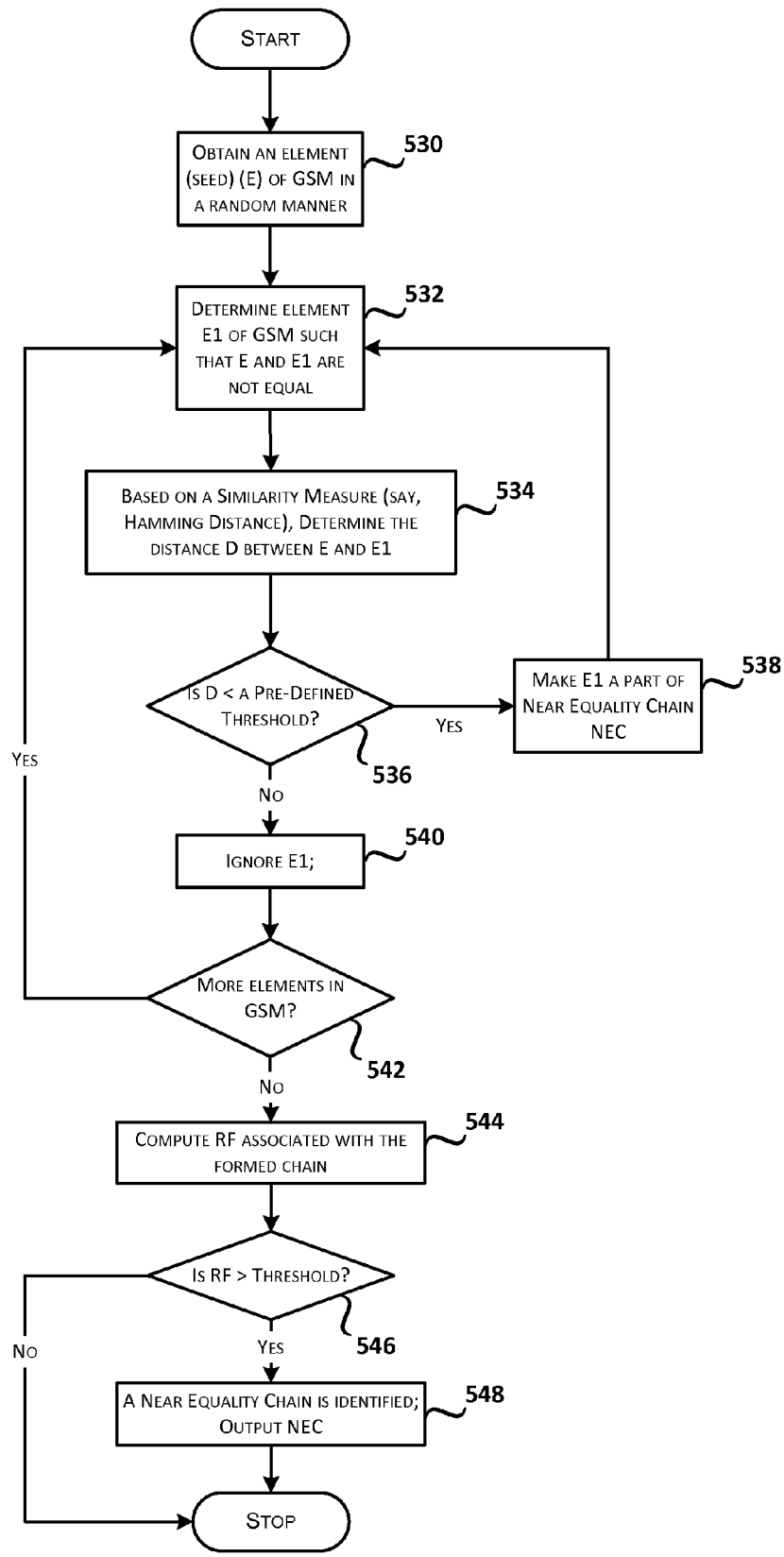
FIG. 5A: IDENTIFYING NEAR EQUALITY CHAINS

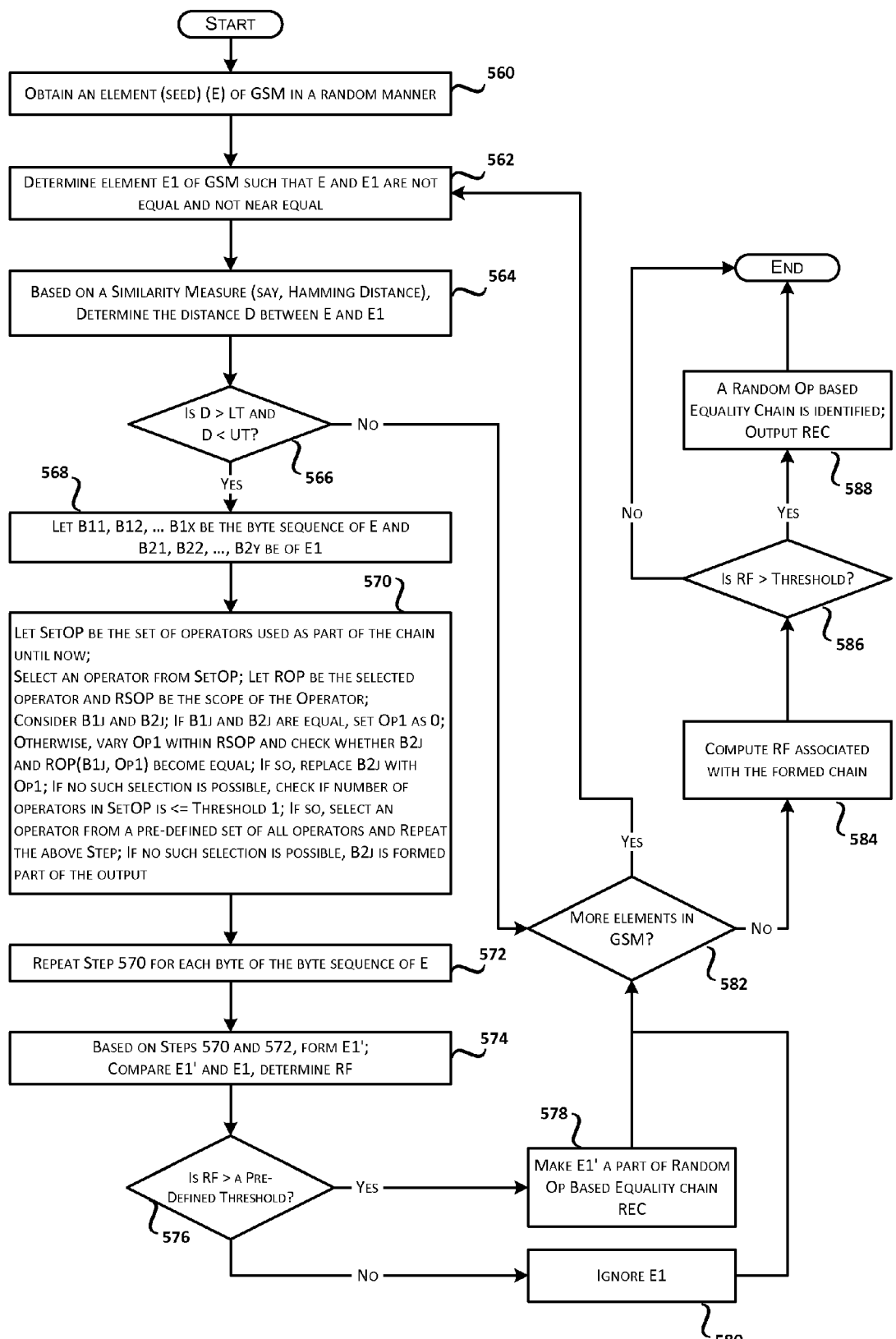
FIG. 5B: IDENTIFYING RANDOM OP BASED EQUALITY CHAINS

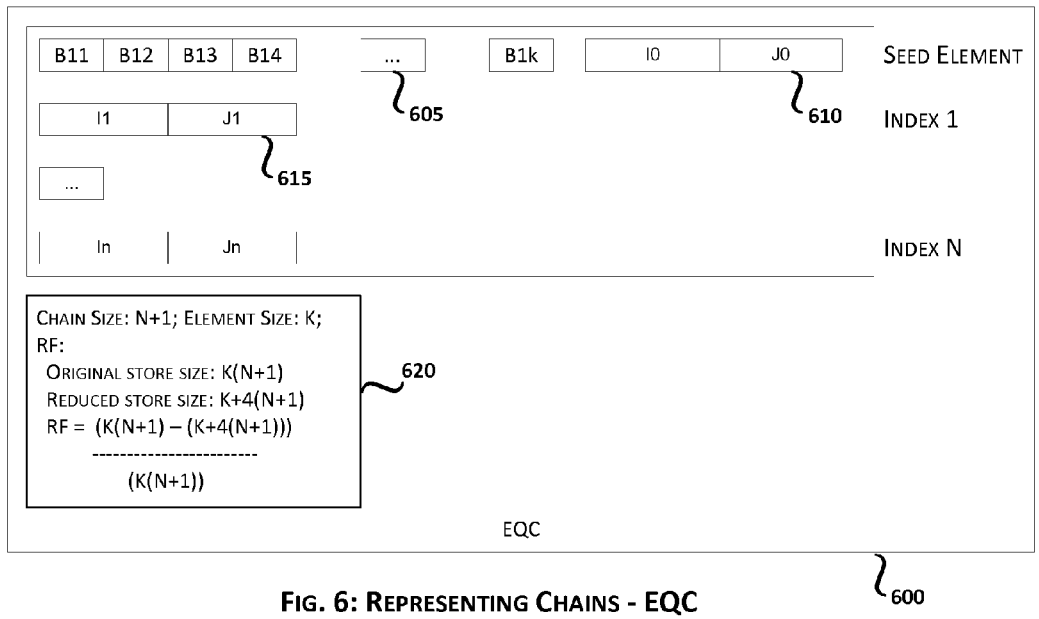
FIG. 6: REPRESENTING CHAINS - EQC
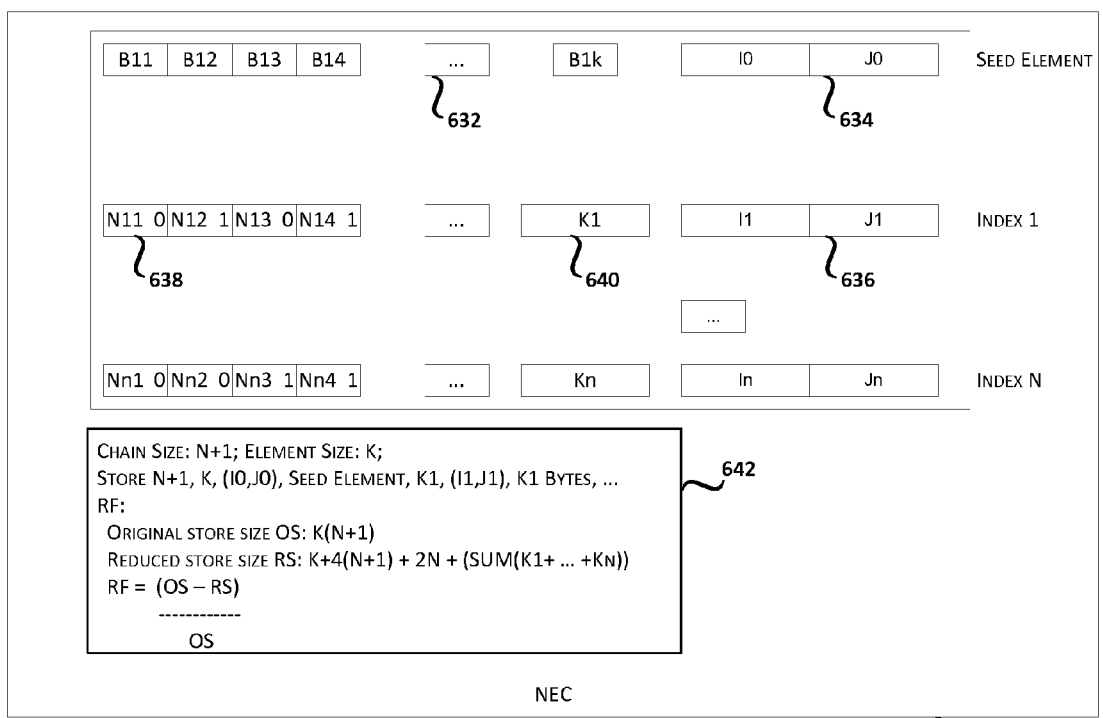
FIG. 6A: REPRESENTING CHAINS - NEC

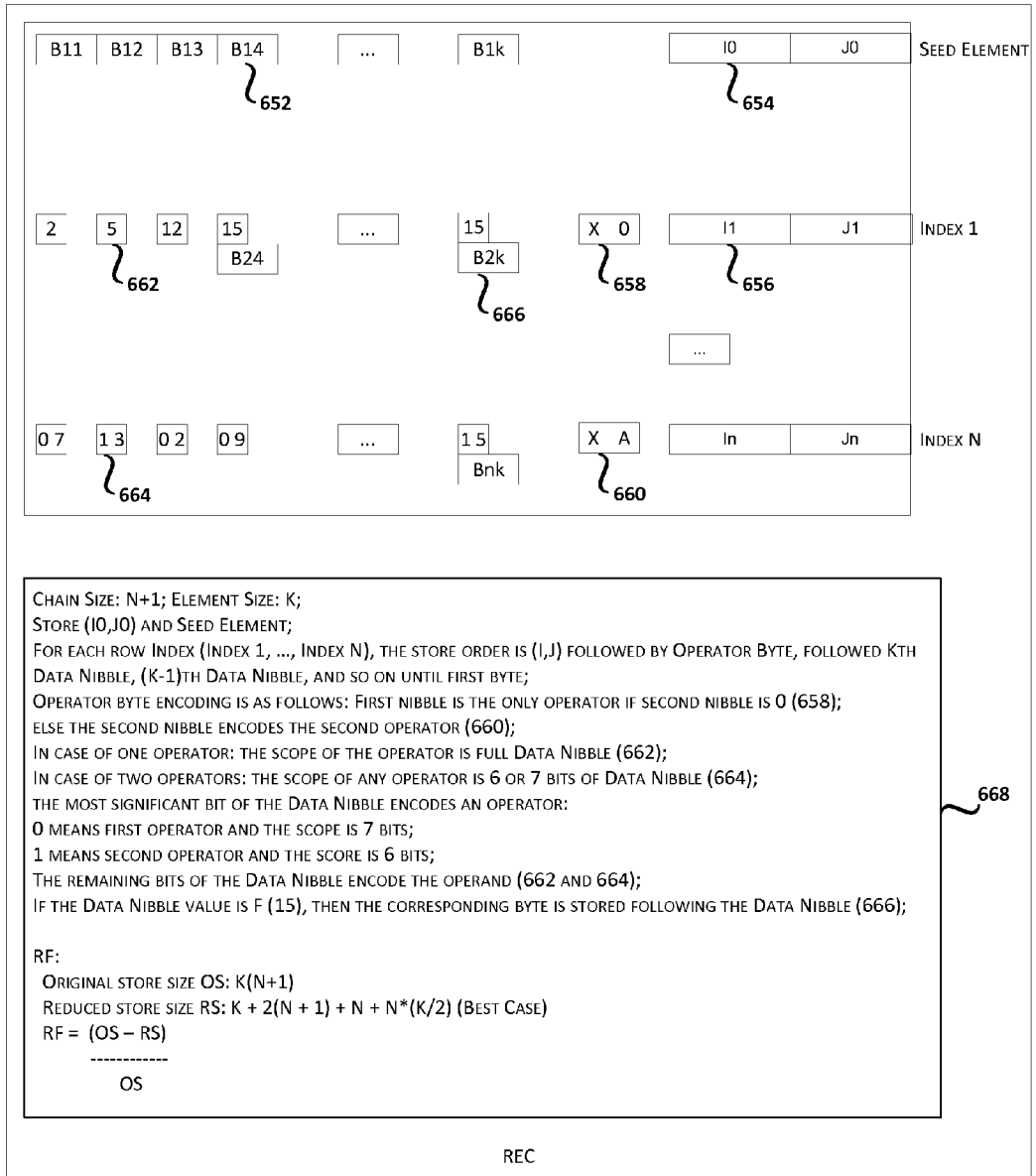
FIG. 6B: REPRESENTING CHAINS - REC

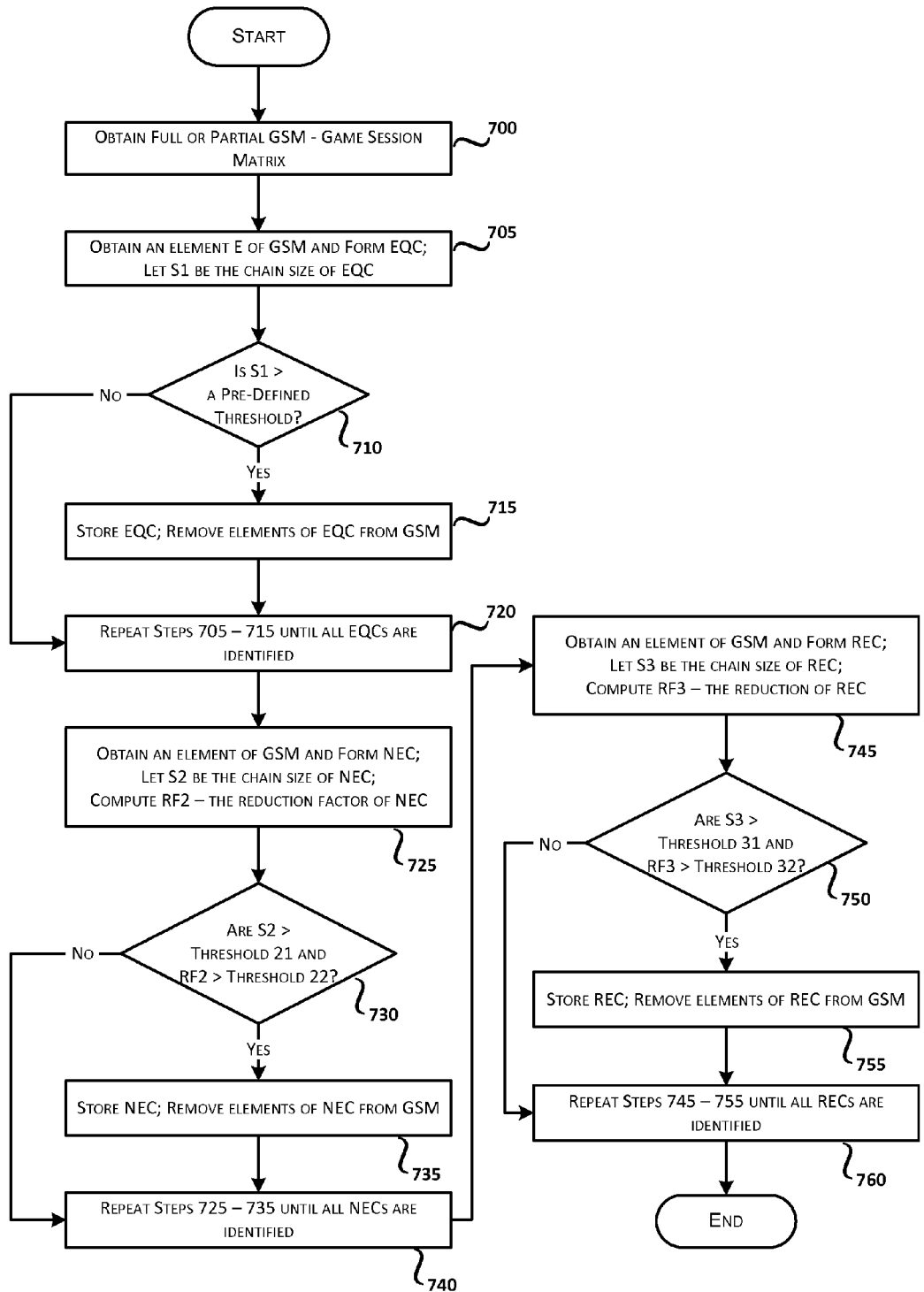
FIG. 7: AN APPROACH FOR ONE-LEVEL GAME STATE REDUCTION

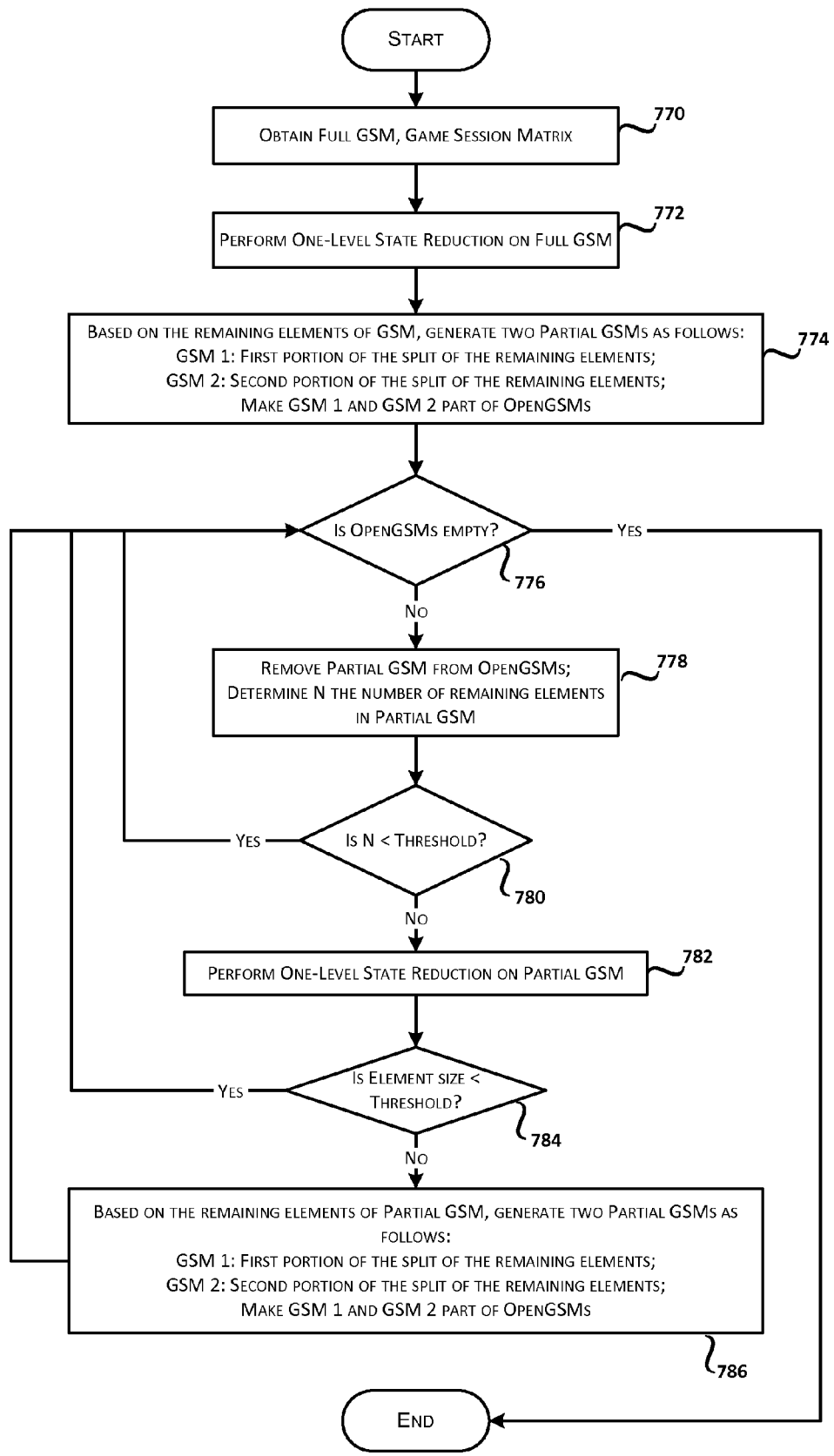
FIG. 7A: AN OVERALL APPROACH FOR GAME STATE REDUCTION

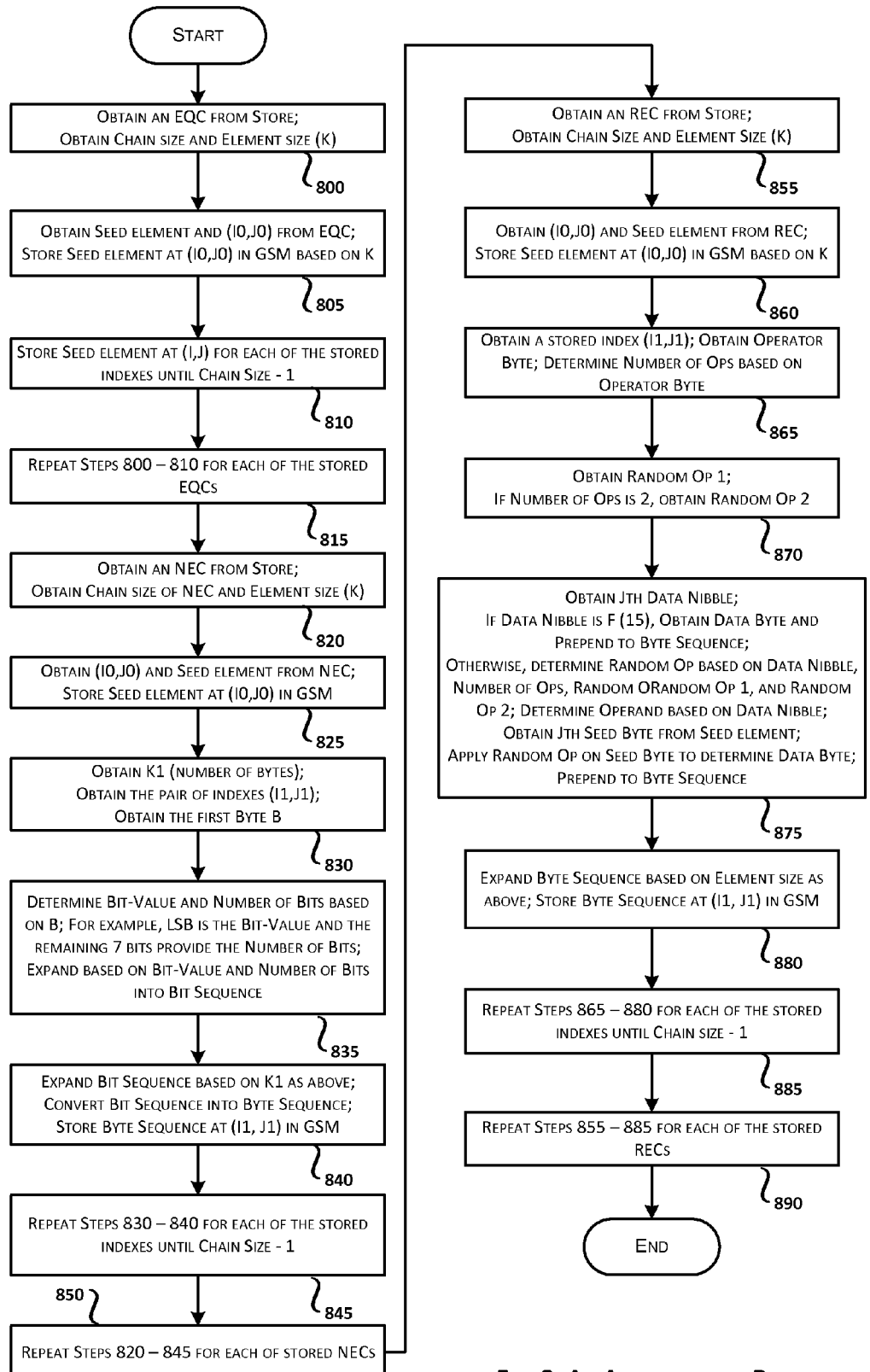
FIG. 8: AN APPROACH FOR RETRIEVAL

SYSTEM AND METHOD FOR GAME STATE REDUCTION

FIELD OF THE INVENTION

The present invention relates generally to a system and method for game state reduction by analysis of the information related to a computer based game system for the purpose of reducing the storage required to store the information, and more particularly in relation to the game state analysis of a computer game system. Still more particularly, the present invention relates to a system for reducing the demand for the storage of game state information contained in a game session matrix.

BACKGROUND OF THE INVENTION

Technological advancements in the fields of communication and social networking have made Internet as the biggest venue for diverse entertainments. Moreover, changing lifestyles have made persons' presence more prominent in cyber world as compared to the real world. Also, accessibility of cyber world from handhelds, computers, and televisions, anytime and anyplace, has fuelled the extended participation in the cyber world.

Apart from using Internet for information, e-commerce, social networking, and communications, the Internet has emerged as the biggest platform for gaming (computer based games) and entertainment. Advancements in software technology and availability of high performance computing systems have resulted in the birth of interesting, captivating, and immersive games that cater to the tastes of heterogeneous kinds of users. Moreover, the availability of multiplayer and massively multiplayer games on Internet has provided an an opportunity to play with others who are distributed across geographies and time zones. One of the critical requirements of such games is to be persistent: a user must be able to leave and join subsequently to continue the game being played.

DESCRIPTION OF RELATED ART

U.S. Pat. No. 7,574,493 to Hutcheson; Doug (San Diego, Calif.), Robinson; Richard (Temecula, Calif.), Caliguri; Steven (Poway, Calif.) for "Method and system for improving the efficiency of state information transfer over a wireless communications network" (issued on Aug. 11, 2009 and assigned to Cricket Communications, Inc. (San Diego, Calif.)) discloses a system and method for managing state information related to an interactive application to accommodate one or more users participating in an interactive application session, wherein the state information comprises local state information specific to each of the one or more user's unique view of the interactive application and global state information.

U.S. Pat. No. 7,280,700 to Tourapis; Alexandros (West Windsor, N.J.), Li; Shipeng (Irvine, Calif.), Wu; Feng (Beijing, CN), Sullivan; Gary J. (Redmond, Wash.) for "Optimization techniques for data compression" (issued on Oct. 9, 2007 and assigned to Microsoft Corporation (Redmond, Wash.)) discloses methods and apparatuses are provided relating to the encoding of data, such as, e.g., images, video, etc.

U.S. Pat. No. 6,758,757 to Luciano, Jr.; Robert Anthony (Reno, Nev.), Crowder; Robert William (Las Vegas, Nev.), Marsden; Russ Frederick (Gardnerville, Nev.) for "Method and apparatus for maintaining game state" (issued on Feb. 15, 2001 and assigned to Sierra Design Group (Reno, Nev.)) discloses a system and method for maintaining player's game state (award credits, partial award states, and non-award or non-credit states) in a gaming environment.

U.S. Pat. No. 6,749,514 to Moriwaki; Jun (Ota-ku, JP), Watanabe; Hiroshi (Ota-ku, JP), Shimizu; Takehiro (Ota-ku, JP) for "Game system and information storage medium" (issued on Jun. 15, 2004 and assigned to Namco Ltd. (Tokyo, JP)) discloses a game system and information storage medium in which a player can easily grasp the contents of the saved data or the game state on the data saving.

"The Partial Migration of Game State and Dynamic Server Selection to Reduce Latency" by Beskow; Paul, Vik; Knut-Helge, Halvorsen; Pal (appeared in Multimedia Tools and Applications, Volume 45, Issue 1-3 (October 2009), Pages: 83-107) addresses the issues related to the stringent latency requirements of massively multi-player online games.

"An Evaluation of Checkpoint Recovery for Massively Multiplayer Online Games" by Salles; Marcos, Cao; Tuan, Sowell; Benjamin, Demers; Alan, Gehrke; Johannes, Koch; Christoph, White; Walker (appeared in the Proceedings of VLDB Endow., Vol. 2, No. 1. (2009), pp. 1258-1269) describes an evaluation of the applicability of existing checkpoint recovery techniques developed for main-memory DBMS to massively multiplayer online games workloads.

"Atomic Quake: Using Transactional Memory in an Interactive Multiplayer Game Server" by Zyulkyarov; Ferad, Gajinov; Vladimir, Unsal; Osman, and Cristal; Adrian, Ayguade; Eduard, Harris; Tim, and Valero; Mateo (appeared in the Proceedings of the 14th ACM SIGPLAN Symposium on Principles and Practice of Parallel Programming (PPoPP), February 2009) describes a large, complex game application that uses transaction memory for synchronized access to game related information.

"Persistence in Massively Multiplayer Online Games" by Zhang; Kaiwen, Kemme; Bettina, and Denault; Alexandre (appeared in Net Games '08: Proceedings of the 7th ACM SIGCOMM Workshop on Network and System Support for Games (2008), pp. 53-58) describes a comparison of a variety of strategies to persist changes of the game world.

"Performance Analysis of Game world Partitioning Methods for Multiplayer Mobile Gaming" by Prasetya; K. and Wu; Z. D. (appeared in the Proceedings of the 7th ACM SIGCOMM Workshop on Network and System Support for Games, Worcester, Mass., Pages: 72-77, 2008) describes a metric for performance analysis and a method for partitioning of game world.

The known systems do not address the issue of game state analysis from the point of view of demanding reduced storage while archiving. The present invention provides for a system and method for game state reduction.

SUMMARY OF THE INVENTION

The primary objective of the invention is to achieve efficient representation of game states of a computer game.

One aspect of the invention is to represent game related information in a game session matrix.

Another aspect of the invention is to identify and represent different kinds of chains based on the information contained in the game session matrix.

Yet another aspect of the invention is to identify and represent equality chains.

Another aspect of the invention is to identify and represent near equality chains.

Yet another aspect of the invention is to identify and represent random operator based equality chains.

Another aspect of the invention is to store the information contained in the game session matrix based on the identified chains.

Yet another aspect of the invention is to retrieve the information back to the game session matrix based on the stored chains.

In a preferred embodiment the present invention provides a system for the analysis of a game session matrix associated with a computer game hosted on a server for the purposes of reducing the storage required to store said game session matrix resulting in a plurality of stored chains, wherein said computer game is played by a plurality of players, an instance of said computer game is played by a plurality of game players of said plurality of players, said instance is a part of a plurality of game instances, said game session matrix comprises of a plurality of game states associated with said plurality of game instances, said game session matrix comprises of a plurality of elements, an element said plurality of elements of said game session matrix is a byte sequence, said system comprising:

means for identifying of a plurality of equality chains based on said game session matrix;

means for identifying of a plurality of near equality chains based on said game session matrix;

means for identifying of a plurality of random operator based equality chains based on said game session matrix;

means for generating of a plurality of stored equality chains based on said plurality of equality chains;

means for making of said plurality of stored equality chains a part of said plurality of stored chains;

means for generating of a plurality of stored near equality chains based on said plurality of near equality chains;

making of said plurality of stored near equality chains a part of said plurality of stored chains;

means for generating of a plurality of stored random operator based equality chains based on said plurality of random operator based equality chains;

means for making of said plurality of stored random operator based equality chains a part of said plurality of stored chains;

means for forming of a remaining elements game session matrix based on said game session matrix, said plurality of equality chains, said plurality of near equality chains, and said plurality of random operator based equality chains;

means for analyzing of said remaining elements game session matrix to result in a plurality of partial stored chains;

means for making of said plurality of partial stored chains a part of said plurality of stored chains; and means for retrieving of said game session matrix based on said plurality of stored chains.

(REFER FIGS. 1, 2, 3, 4, 4A, 7, and 7A)

BRIEF DESCRIPTION OF THE DRAWINGS

FIG. 1 provides an overview of a typical gaming system.
FIG. 2 provides an illustration of game instances and game states.
FIG. 3 provides an illustrative game session matrix.
FIG. 4 depicts illustrative state chains.
FIG. 4A provides a brief on different kinds of chains.
FIG. 5 describes an approach for identifying of equality chains.
FIG. 5A describes an approach for identifying of near equality chains.
FIG. 5B describes an approach for identifying of random operator based equality chains.
FIG. 6 depicts representing of equality chains.
FIG. 6A depicts representing of near equality chains.
FIG. 6B depicts representing of random operator based equality chains.
FIG. 7 provides an approach for one-level game state reduction.
FIG. 7A provides an overall approach for game state reduction.
FIG. 8 provides an approach for game session matrix retrieval.

DETAILED DESCRIPTION OF THE PREFERRED EMBODIMENTS

FIG. 1 provides an overview of a typical gaming system. The gaming system (100) allows for interactions by multiple players (110) and generates gaming behaviors (120) that are appropriate based on the player interactions. The system analyses the player interactions (130) and generates the behavior based on game instance information (140) that contains information related to how the game with respect to a particular has proceeded until now, and a game state information (150) that contains information related to a particular game being played. In order to be able to provide persistent gaming environment, the game instance information and game state information needs to be archived in a game database (160 and 170). The game session matrix containing the information about the various instances of the game being played is analyzed, stored in a database, and retrieved on demand. The game behavior analysis (180) subsystem generates the game actions based on player actions, game states, and game instances.

One of the key requirements of a gaming system is to achieve efficient game state archiving along with game session information. Each instance of a game results in a game session and accumulates a large amount of data as the game progresses. The game information archiving and retrieval (on demand) needs to be able to efficiently store such a large amount of data.

FIG. 2 provides an illustration of game instances and game states.

Typically, a computer game (200) is hosted on a server and is accessible over a network. The users get connected to the server and play the game. An instance of the game is a player (assuming that the game is a single player game) playing the game; the game instance stores all the information related to the player's game. The server is capable of supporting multiple players playing simultaneously and hence, there are several game instances (210). Each game instance is the result of interactions of a set of players essential to play the game (215). These multiple game instances form part of game session space (220). Each game instance is also associated with a game state (230) and the several game states form part of a game state space (240).

FIG. 3 provides an illustrative game session matrix.

A game session matrix (GSM) (300) is an information base managed by the game server. The elements of the matrix are indexed by an instance (310) and a state (320). For example, 330 is the Ith instance's Jth state information. Typically, an element of GSM has two distinct components:

Game dependent portion of the session/state information (350) and Game independent portion of the game session/state information (360). For example, game independent information includes information such as user profile while game dependent portion includes information such as current game state and the game specific user interactions.

FIG. 4 depicts illustrative state chains.

Consider game session matrix GSM (400). The figure depicts three distinct kinds of chains, namely, equality chain (410), near equality chains (420), and random operator based equality chains (430).

FIG. 4A provides a brief on different kinds of chains.

A brief about the different kinds of chains is provided below (450):

Different kinds of Chains:

A chain is a sequence of elements of a game session matrix, wherein the elements satisfy certain common one or more properties.

Note:

Each element is represented as a byte sequence.

Each chain has a seed element that forms the basis for the chain.

A chain is formed only if the reduction factor associated with the chain exceeds a pre-defined threshold.

Reduction factor is defined as the amount of reduction achieved by a chain representation of a set of sequence of bytes.

Equality Chains (EQCs) (410): An equality chain is a chain in which the elements of the chain are precisely equal.

Near Equality Chains (NECs) (420): A near equality chain is a chain in which the elements of the chain are not so precisely equal. That is, the elements are "similar" to the seed element based on a pre-defined similarity measure.

Random Operator based Equality Chains (RECs) (430): A random operator based equality chain is a chain in which the elements become equal upon applying of a random operator on the seed element. Typical examples of random operator are SWAP (X), ADD (A), and SUBTRACT (S).

FIG. 5 describes an approach for identifying of equality chains.

In the following, GSM refers to a session matrix consisting of only game-dependent information.

Means and an approach for EQC identification:

Obtain an element (seed) (E) of GSM in a random manner (500). Determine element E1 of GSM such that E and E1 are equal (502). If so (504), make E1 a part of Equality Chain EQC (506) and proceed to Step 502. Otherwise, ignore E1 (508) and if there are more elements in GSM (510), proceed to Step 502. If there are no more elements in GSM (510), Compute the reduction factor, RF, associated with the formed chain (512). If RF>a pre-defined threshold (514), then an Equality Chain is identified and Output EQC (516).

FIG. 5A describes an approach for identifying of near equality chains.

Means and an approach for near equality chain identification:

Obtain an element (seed) (E) of GSM in a random manner (530). Determine element E1 of GSM such that E and E1 are not equal (532). Based on a Similarity Measure (say, Hamming Distance), determine the distance D between E and E1 (534). If D is less than a pre-defined threshold (536), make E1 a part of Near Equality Chain NEC (538) and proceed to Step 532. Otherwise, ignore E1 (540) and if there are more elements in GSM (542), proceed to Step 532. If there are no more elements in GSM (542), Compute the reduction factor, RF, associated with the formed chain (544). If RF>a pre-defined threshold (546), then a Near Equality Chain is identified and Output NEC (548).

FIG. 5B describes an approach for identifying of random operator based equality chains.

Means and an approach for random operator based equality chain identification:

This kind of chain is formed based on the possibility of reducing a byte (Byte 2) of an element based on a byte (Byte 1) of another element. That is, a given operator is applied on Byte 1 to check whether it becomes equal to Byte 2. Byte 1 is within the scope of the operator from Byte 2. By limiting the number of operators used as part of a chain and the scope of each of these operators, the amount of possible reduction gets enhanced.

Obtain an element (seed) (E) of GSM in a random manner (560). Determine element E1 of GSM such that E and E1 are not equal and not near equal (562). Based on a Similarity Measure (say, Hamming Distance), Determine the distance D between E and E1 (564). Check if D is greater than a lower threshold and lesser than an upper threshold (566). If it is not the case, proceed to Step 582. If so (566), let B11, B12, .... B1x be the byte sequence of E and B21, B22, . . . , B2y be of E1 (568). The next step is to check whether a byte of E1 can be reduced based on an operator (570).

Let SetOP be the set of operators used as part of the chain until now;

Select an operator from SetOP;

Let ROP be the selected operator and RSOP be the scope of the Operator;

Consider B1$j$ and B2$j$; If B1$j$ and B2$j$ are equal, set Op1 as 0; Otherwise, vary Op1 within RSOP and check whether B2$j$ and ROP(B1$j$, Op1) become equal;

If so, replace B2$j$ with Op1;

If no such selection is possible, check if number of operators in SetOP is <=Threshold 1;

If so, select an operator from a pre-defined set of all operators and Repeat the above Step;

If no such selection is possible, B2$j$ is formed part of the output.

The idea is to use a minimum number of operators to reduce as many elements of the chain being formed as possible. Judicious selection of operators and the scope of the operators provide an opportunity to maximize the achievable reduction.

Repeat Step 570 for each byte of the byte sequence of E (572).

Based on Steps 570 and 572, form E1'; and Compare E1' and E1, determine the reduction factor RF (574). Check if RF exceeds a pre-defined threshold (576). If so, Make E1' a part of Random Op Based Equality chain REC (578). In this context, E1 and E are said to be near random operator based equal elements. Otherwise (576), Ignore E1 (580). Check if more elements are available for processing in GSM (582). If so, proceed to Step 562. Otherwise, Compute the reduction factor RF associated with the formed chain (584). Check if RF exceeds a pre-defined threshold (586). If so, a Random Op based Equality Chain (REC) is identified; and Output REC (588).

FIG. 6 depicts representing of equality chains.

Means for representing an equality chain:

Consider an illustrative EQC (600). The seed element (605) is a sequence of bytes and is represented in entirety. The pair (I0,J0) represents the index of the seed element with respect to GSM (610). The subsequent elements of EQC are stored based on their respective index pairs. For example, 615 depicts the index pair of the second element. The salient information related to EQC is depicted in 620: Chain size of the depicted EQC is N+1 with each element size being K bytes. The reduction factor RF is calculated based on the original store size (OS) and the reduced store size (RS). As shown, the original store size is K(N+1) bytes while the reduced store size is K+4(N+1) and RF is computed as (OS−RS)/OS that is (K(N+1)−(K+4(N+1)))/(K(N+1)). The storage representation of an equality chain is as follows: store the chain size N+1, element size K, index pair (I0,J0), seed element, (I1,J1), and so on for all the remaining elements of the equality chain.

FIG. 6A depicts representing of near equality chains.

Means for representing a near equality chain:
Consider an illustrative NEC (630). The Seed element (632) is a sequence of bytes and is represented in its entirety. The pair (I0,J0) represents the index of the seed element with respect to GSM (634). The Chain size, Element size (K), (I0,J0), and Seed element are stored. The subsequent elements of NEC are stored based on their respective index pairs. For example, 636 depicts the index pair of the second element. In NEC, the subsequent elements are presented based on their nearness with respect to the seed element. Consider the measuring of nearness based on, say, Hamming distance criterion. If the two corresponding bytes of the seed element and the element under consideration are same, then the representation includes a byte of zeros. Otherwise, the representation of the byte under consideration includes a bit 1 in positions wherever there is a mismatch. Note that this is achieved by a logical bit-wise exclusive or (ex- or) operation on the two bytes under consideration. Once such a sequence of zeros and ones is obtained as a representation of the element under consideration, an encoded byte (638) is derived as follows: count the number of zeros and represent the least significant bit as 0 and the remaining seven bits encode the number of consecutive zeros (N11). On the other hand, if the count is of contiguous sub-sequence of ones, then the least significant bit is set as 1. Finally, K1 is the count of bytes encoded as above (640). The salient information related to NEC is depicted in 642: Chain size of the depicted NEC is N+1 with each element size being K bytes. Store K, (I0,J0), Seed Element, K1, (I1,J1), K1 Bytes, and so on. The reduction factor RF is calculated based on the original store size (OS) and the reduced store size (RS). As shown, the original store size is K(N+1) bytes while the reduced store size is K+4(N+1)+2N+(SUM(K1+ . . . +Kn)) and the RF is computed as (OS−RS)/OS that is (K(N+1)−(K+4(N+1)+2N+(SUM(K1+ . . . +Kn))))/(K(N+1)).

FIG. 6B depicts representing of random operator based equality chains.

Means for representing a random operator based equality chain:
Consider an illustrative REC (650). The Seed element (652) is a sequence of bytes and is represented in its entirety. The pair (I0,J0) represents the index of the seed element with respect to GSM (654). The Chain size, Element size (K), (I0, J0), and Seed element are stored. The subsequent elements of REC are stored based on their respective index pairs. For example, 656 depicts the index pair of the second element. In REC, a byte, called as Operator Byte, is used to represent one or two operators that get used in the encoding of the byte sequence (658). The Operator Byte encoding is as follows:
(a) First nibble is the only operator if the second nibble is 0 (658); else the second nibble encodes the second operator (660).
(b) Note that the illustrative set of operators include SWAP (X), ADD (A), and SUBTRACT (S). Consider the swap operator. Let the scope of the swap operand be m; This indicates that a byte of the element under consideration is derived by applying the swap operator on the mth byte to the right from the byte in the seed element. In other words, the mth byte of the seed element (starting from the position of a byte that corresponds with the byte) and the byte are equal.

Based on the selected operator or a pair of operators, each data byte of the element under consideration is encoded by a Data Nibble:
(a) In case of one operator, the scope of the operator is full Data Nibble (662).
(b) On the other hand, in case of two operators, the scope of any operator is either 6 or 7 bits of Data Nibble (664).
(b1) In this case, the most significant bit of the Data Nibble encodes an operator:
0 means first operator and the operand scope is 7 bits;
1 means second operator and the operand scope is 6 bits.
(b2) The remaining bits of the Data Nibble encode the operand (662 and 664).
(c) If the Data Nibble value is F (15), then the corresponding byte is stored following the Data Nibble (666).

The salient information related to REC is depicted in 668: Chain size of the depicted REC is N+1 with each element size being K bytes. For each row Index (Index 1, . . . , Index N), the store order is (I,J) followed by Operator Byte, followed Kth Data Nibble, (K−1)th Data Nibble, and so on until first byte's corresponding data nibble.

The reduction factor RF is calculated based on the original store size (OS) and the reduced store size (RS). As shown, the original store size is K(N+1) bytes while the reduced store size is K+2(N+1)+N+N*(K/2) (Best Case) and the RF is computed as (OS−RS)/OS that is (K(N+1)−(K+2(N+1)+N+N*(K/2)))/(K(N+1)).

FIG. 7 provides an approach for one-level game state reduction.

Means and an approach for the analysis of a game session matrix:
The input for one-level reduction is either a full GSM or a partial GSM. A full GSM is the overall game session matrix while the partial GSM denotes a game session matrix in which each element being a portion of the corresponding element in the full GSM. This element partition is undertaken to check the possibility of achieving further reduction. That is, in the first iteration, the full GSM is analyzed to form as many chains as possible; if substantial number of elements still remain, then the elements are split into two halves and two GSMs are formed: GSM1 is a partial GSM with its each element being a first portion of the split element and GSM2 is another partial GSM with second portion of the split elements as its elements. GSM1 and GSM2 are separately analyzed for chain identification.

Obtain Full or Partial GSM—Game Session Matrix (700). Obtain an element E of GSM and Form EQC and let S1 be the chain size of EQC (705). Check if S1>a Pre-Defined Threshold (710). If so, Store EQC and Remove elements of EQC from GSM (715). Repeat Steps 705-715 until all EQCs are identified (720). Obtain an element of GSM and Form NEC and let S2 be the chain size of NEC;

Compute RF2—the reduction factor of NEC (725). Check if S2>Threshold 21 and RF2>Threshold 22 (730). If so, then Store NEC and Remove elements of NEC from GSM (735). Repeat Steps 725-735 until all NECs are identified (740).

Obtain an element of GSM and Form REC and Let S3 be the chain size of REC; Compute RF3—the reduction of REC (745). Check if S3>Threshold 31 and RF3>Threshold 32 (750). If so, Store REC and Remove elements of REC from GSM (755). Repeat Steps 745-755 until all RECs are identified (760).

FIG. 7A provides an overall approach for game state reduction.

Means and an overall approach for the analysis of a game session matrix:
Obtain Full GSM, Game Session Matrix (770). Perform One-Level State Reduction on Full GSM (772).
Based on the remaining elements of GSM, generate two Partial GSMs as follows (774):
GSM 1: First portion of the split of the remaining elements;
GSM 2: Second portion of the split of the remaining elements;
Make GSM 1 and GSM 2 part of OpenGSMs.
Check if OpenGSMs is empty (776). If OpenGSMs is not empty, then Remove Partial GSM from OpenGSMs and determine N the number of remaining elements in Partial GSM (778). Check if N<Threshold (780). If so, proceed to Step 776. Otherwise, Perform One-Level State Reduction on Partial GSM (782). Obtain the Element size of the remaining elements of Partial GSM. If the Element size is <a pre-defined threshold, then proceed to Step 776. Otherwise, based on the remaining elements of Partial GSM, generate two Partial GSMs as follows (786):
GSM 1: First portion of the split of the remaining elements;
GSM 2: Second portion of the split of the remaining elements;
Make GSM 1 and GSM 2 part of OpenGSMs and proceed to Step 776. Note that Partial GSM contains the elements that did not form part of any of the identified chains.

FIG. 8 provides an approach for game session matrix retrieval.

Means and an approach for the retrieval of a game session matrix:
Obtain an EQC from Store; and Obtain Chain size and Element size (K) (800). Obtain Seed element and (I0,J0) from EQC; and Store Seed element at (I0,J0) in GSM based on K (805). Store Seed element at (I,J) for each of the stored indexes until Chain Size—1 (810). Repeat Steps 800-810 for each of the stored EQCs (815).
Obtain an NEC from Store; and Obtain Chain size of NEC and Element size (K) (820). Obtain (I0,J0) and Seed element from NEC; and Store Seed element at (I0,J0) in GSM (825). Obtain K1 (number of bytes), Obtain the pair of indexes (I1,J1), and Obtain the first Byte B (830). Determine Bit-Value and Number of Bits based on B; For example, LSB is the Bit-Value and the remaining 7 bits provide the Number of Bits; Expand based on Bit-Value and Number of Bits into Bit Sequence (835). Expand Bit Sequence based on K1 as above; Convert Bit Sequence into Byte Sequence; and Store Byte Sequence at (I1, J1) in GSM (840). Repeat Steps 830-840 for each of the stored indexes until Chain Size—1 (845). Repeat Steps 820-845 for each of stored NECs (850). Obtain an REC from Store; and Obtain Chain Size and Element Size (K) (855). Obtain (I0,J0) and Seed element from REC; and Store Seed element at (I0,J0) in GSM based on K (860). Obtain a stored index (I1,J1); Obtain Operator Byte; and Determine Number of Ops based on Operator Byte (865). Obtain Random Op 1; and If Number of Ops is 2, obtain Random Op 2 (870). Obtain Jth Data Nibble; If Data Nibble is F (15), Obtain Data Byte and prepend to Byte Sequence; Otherwise, determine Random Op based on Data Nibble, Number of Ops, Random ORandom Op 1, and Random Op 2; Determine Operand based on Data Nibble; Obtain Jth Seed Byte from Seed element; Apply Random Op on Seed Byte to determine Data Byte; and Prepend to Byte Sequence (875). Expand Byte Sequence based on Element size as above; and Store Byte Sequence at (I1, J1) in GSM (880). Repeat Steps 865-880 for each of the stored indexes until Chain size—1 (885). Repeat Steps 855-885 for each of the stored RECs (890).

Thus, a system and method for game state reduction based on the analysis of game session matrix is disclosed. Although the present invention has been described particularly with reference to the figures, it will be apparent to one of the ordinary skill in the art that the present invention may appear in any number of systems that provide for analysis of a matrix based representation for archival purposes. It is further contemplated that many changes and modifications may be made by one of ordinary skill in the art without departing from the spirit and scope of the present invention.

We claim:

1. A computer-implemented method for game state reduction by analyzing a game session matrix associated with a computer game hosted on a server for the purposes of reducing the storage required to store said game session matrix resulting in a plurality of stored chains, wherein said computer game is played by a plurality of players, an instance of said computer game is played by a plurality of game players of said plurality of players, said instance is a part of a plurality of game instances, said game session matrix comprises of a plurality of game states associated with said plurality of game instances, said game session matrix comprises of a plurality of elements, an element said plurality of elements of said game session matrix is a byte sequence, the method performed on a computer system comprising at least one processor, said method comprises the steps of:

identifying, with at least one processor, a plurality of equality chains based on said game session matrix;

identifying, with at least one processor, a plurality of near equality chains based on said game session matrix;

identifying, with at least one processor, a plurality of random operator based equality chains based on said game session matrix;

generating, with at least one processor, a plurality of stored equality chains based on said plurality of equality chains;

making, with at least one processor, said plurality of stored equality chains a part of said plurality of stored chains;

generating, with at least one processor, a plurality of stored near equality chains based on said plurality of near equality chains;

making, with at least one processor, said plurality of stored near equality chains a part of said plurality of stored chains;

generating, with at least one processor, a plurality of stored random operator based equality chains based on said plurality of random operator based equality chains;

making, with at least one processor, said plurality of stored random operator based equality chains a part of said plurality of stored chains;

forming, with at least one processor, a remaining elements game session matrix based on said game session matrix, said plurality of equality chains, said plurality of near equality chains, and said plurality of random operator based equality chains;

analyzing, with at least one processor, said remaining elements game session matrix to result in a plurality of partial stored chains;

making, with at least one processor, said plurality of partial stored chains a part of said plurality of stored chains; and retrieving, with at least one processor, said game session matrix based on said plurality of stored chains.

2. The method of claim 1, wherein said step for identifying an equality chain of said plurality of equality chains further comprises the steps of:

determining a seed element of said game session matrix, wherein said seed element is an element of said plurality of elements selected in a random manner;

making said seed element a part of a chain;

determining a second element of said plurality of elements of said game session matrix, wherein said second element is equal to said seed element;

making second element a part of said chain;

determining a plurality of equal elements of said game session matrix, wherein each of said plurality of equal elements is a part of said plurality of elements and is equal to said seed element;

making said plurality of equal elements a part of said chain;

computing a reduction factor based said seed element, said second element, said plurality of equal elements, and said chain, wherein said reduction factor exceeds a pre-defined threshold; and making said chain as said equality chain if said reduction factor exceeds a pre-defined threshold.

3. The method of claim 1, wherein said step for identifying a near equality chain of said plurality of near equality chains further comprises the steps of:

determining a seed element of said game session matrix, wherein said seed element is an element of said plurality of elements selected in a random manner;

making said seed element a part of a chain;

determining a second element of said plurality of elements of said game session matrix wherein said second element is near equal to said seed element based on a similarity measure and a pre-defined threshold;

making said second element a part of said chain;

determining a plurality of near equal elements of said game session matrix, wherein each of said plurality of near equal elements is a part of said plurality of elements and is near equal to said seed element based on said similarity measure and said pre-defined threshold;

making said plurality of near equal elements a part of said chain;

computing a reduction factor based said seed element, said second element, said plurality of near equal elements, and said chain, wherein said reduction factor exceeds a pre-defined threshold; and making said chain as said near equality chain if said reduction factor exceeds a pre-defined threshold.

4. The method of claim 1, wherein said step for identifying a random operator based equality chain of said plurality of random operator based equality chains further comprises the steps of:

determining a seed element of said game session matrix, wherein said seed element is an element of said plurality of elements selected in a random manner;

making said seed element a part of a chain;

selecting an operator based on a plurality of operators;

determining a scope of said operator;

determining a second element of said plurality of elements of said game session matrix wherein said second element is not equal to said seed element and is not near equal to said seed element;

determining a distance between said seed element and said second element based on a similarity measure and a pre-defined threshold, wherein said distance is greater than a lower threshold and is lesser than an upper threshold;

determining a byte 11 of a byte sequence 1 associated with seed element;

determining a byte 21 of a byte sequence 2 associated with said second element;

determining a byte 1× of said byte sequence 1 based on an operand and said scope, wherein said byte 1× and said byte 21 are equal based on said operator and said operand;

forming said operator and said operand a part of a chain element;

making said byte 21 a part of said chain element, wherein the value of said operand is a pre-defined value;

updating said chain element based on said byte sequence 2 and said byte sequence 2;

determining an element reduction factor based on said byte sequence 2 and said chain element;

making said chain element a part of said chain, wherein said element reduction factor exceeds a pre-defined threshold;

determining a plurality of random operator based equality elements based on said game session matrix, wherein each of said plurality of random operator based equality elements is an element of said plurality of elements and is near random operator based equivalent to said seed element based on said plurality of operators;

determining a plurality of chain elements based on said plurality of random operator based equality elements;

making said plurality of chain elements a part of said chain;

determining a reduction factor based on said seed element, said second element, said plurality of random operator based equality elements, and said chain, wherein said reduction factor exceeds a pre-defined threshold; and making said chain a part of said plurality of random operator based equality chains.

5. The method of claim 1, wherein said step for generating a stored equality chain of said plurality of stored equality chains further comprises the steps of:

obtaining an equality chain of said plurality of equality chains;

determining a chain size of said equality chain;

determining a seed element of said equality chain;

determining an element size of said seed element;

determining an index pair 0 of said seed element with respect to said game session matrix;

determining a second element of said equality chain;

determining an index pair 1 of said second element with respect to said game session matrix;

determining a plurality of index pairs associated with a plurality of equal elements of said equality chain, wherein said plurality of equal elements excludes said seed element and said second element;

storing said chain size as a part of said stored equality chain;

storing said element size as a part of said stored equality chain;

storing said index pair 0 as a part of said stored equality chain;

storing said seed element as a part of said stored equality chain;

storing said index pair 1 as a part of said stored equality chain; and storing said plurality of index pairs as a part of said stored equality chain.

6. The method of claim 1, wherein said step for generating a stored near equality chain of said plurality of stored near equality chains further comprises the steps of:

obtaining a near equality chain of said plurality of near equality chains;
determining a chain size of said near equality chain;
determining a seed element of said near equality chain;
determining an element size of said seed element;
determining an index pair 0 of said seed element with respect to said game session matrix;
determining a second element of said near equality chain;
determining an index pair 1 of said second element with respect to said game session matrix;
determining a seed bit sequence based on a byte sequence 1 associated with said seed element;
determining a second bit sequence based on a byte sequence 2 associated with said second element;
performing exclusive or bit logical operation on said seed bit sequence and said second bit sequence resulting in a bit sequence x;
determining a plurality of zero bits, wherein each of said plurality of bits is contiguous in said bit sequence x;
forming a bit count pair comprising of 0 and a count based on said plurality of zero bits;
forming a plurality of bit count pairs, wherein a bit count pair of said plurality of bit count pairs comprises of a bit and a count of said bit, wherein said count number of said bit are contiguous in said bit sequence x;
computing a count 1 based on said plurality of bit count pairs;
representing said second element as a stored representation of a plurality of stored representations comprising of said count 1, said index pair 1, said plurality of bit count pairs;
determining said plurality of stored representations based on a plurality of near equal elements of said near equality chain, wherein said plurality of near equal elements excludes said seed element;
storing said chain size as a part of said stored near equality chain;
storing said element size as a part of said stored near equality chain;
storing said index pair 0 as a part of said stored near equality chain;
storing said seed element as a part of said stored near equality chain; and
storing said plurality of stored representations as a part of said near equality chain.

7. The method of claim 1, wherein said step for generating a stored random operator based equality chain of said plurality of stored random operator based equality chains further comprises the steps of:
obtaining a random operator based equality chain of said plurality of random operator based equality chains;
determining a chain size of said random operator based equality chain;
determining a seed element of said random operator based equality chain;
determining an element size of said seed element;
determining an index pair 0 of said seed element with respect to said game session matrix;
determining a second element of said random operator based equality chain;
determining an index pair 1 of said second element with respect to said game session matrix;
determining a plurality of operators, wherein each of said plurality of operators is a part of said second element;
forming an operator byte based on said plurality of operators;
determining a byte sequence 2 of said second element;
determining a byte 1 of said byte sequence 2;
determining an operator of said plurality of operators associated with said byte 1;
determining an operand of said operator associated with byte 1;
forming a data nibble 1 of a plurality of data nibbles based on said operator and said operand;
associating a data nibble byte with said data nibble 1 based on said data nibble 1 and said byte 1, wherein the value of said data nibble 1 is a pre-defined value;
forming a stored representation of a plurality of stored representations comprising of said index pair 1, said operator byte, and said plurality of data nibbles;
determining said plurality of stored representations, wherein said plurality of stored representations is based on a plurality of random operator based equal elements of said random operator based equality chain excluding said seed element;
storing said chain size as a part of said stored random operator based equality chain;
storing said element size as a part of said stored random operator based equality chain;
storing said index pair 0 as a part of said stored random operator based equality chain;
storing said seed element as a part of said stored random operator based equality chain; and
storing said plurality of stored representations as a part of said stored random operator based equality chain.

8. The method of claim 1, wherein said step for analyzing said remaining elements game session matrix further comprises the steps of:
determining an element of said remaining elements game session matrix;
splitting said element into a first portion of said element and a second portion of said element;
making said first portion of said element a part of a partial game session matrix 1;
making said second portion of said element a part of a partial game session matrix 2;
identifying a plurality of equality chains 1 based on said partial game session matrix 1;
identifying a plurality of near equality chains 1 based on said partial game session matrix 1;
identifying a plurality of random operator based equality chains 1 based on said partial game session matrix 1;
identifying a plurality of equality chains 2 based on said partial game session matrix 2;
identifying a plurality of near equality chains 2 based on said partial game session matrix 2;
identifying a plurality of random operator based equality chains 2 based on said partial game session matrix 2;
generating a plurality of stored equality chains 1 based on said plurality of equality chains 1;
making said plurality of stored equality chains 1 a part of said plurality of partial stored chains;
generating a plurality of stored near equality chains 1 based on said plurality of near equality chains 1;
making said plurality of stored near equality chains 1 a part of said plurality of partial store chains;
generating a plurality of stored random operator based equality chains 1 based on said plurality of random operator based equality chains 1;
making said plurality of stored random operator based equality chains 1 a part of said plurality of partial store chains;
generating a plurality of stored equality chains 2 based on said plurality of equality chains 2;

making said plurality of stored equality chains 2 a part of said plurality of partial stored chains;
generating a plurality of stored near equality chains 2 based on said plurality of near equality chains 2;
making said plurality of stored near equality chains 2 a part of said plurality of partial store chains;
generating a plurality of stored random operator based equality chains 2 based on said plurality of random operator based equality chains 2; and
making said plurality of stored random operator based equality chains 2 a part of said plurality of partial store chains.

9. The method of claim 1, wherein said step for retrieving said game session matrix further comprises the steps of:
determining a stored equality chain based on said plurality of stored chains;
determining a chain size based on stored equality chain;
determining an element size based on said stored equality chain;
determining an index pair 0 based on said stored equality chain;
determining a seed element based on said stored equality chain, said chain size, and said element size;
making said seed element a part of said game session matrix based on said index pair 0;
determining a plurality of index pairs based on said stored equality chain and said chain size; and
making said seed element a part of said game session matrix based on said plurality of index pairs and said element size.

10. The method of claim 9, wherein said step further comprises the steps of:
determining a stored near equality chain based on said plurality of stored chains;
determining a chain size based on said stored near equality chain;
determining an element size based on said near equality chain;
determining an index pair 0 based on said stored equality chain;
determining a seed element based on said stored near equality chain, said chain size, and said element size;
making said seed element a part of said game session matrix based on said index pair 0;
determining a number of bytes based on said stored near equality chain;
determining an index pair 1 of a plurality of index pairs based on said stored near equality chain;
obtaining a first byte based on said stored near equality chain;
determining a bit-value and a number of bits based on said first byte;
expanding said bit-value into a bit sequence based on said number of bits;
making said bit sequence a part of a plurality of bit sequences;
forming a byte sequence of a plurality of byte sequences based on said plurality of bit sequences; and
making said plurality of byte sequences a part of said game session matrix based on said plurality of index pairs and said element size.

11. The method of claim 9, wherein said step further comprises the steps of:
determining a stored random operator based equality chain based on said plurality of stored chains;
determining a chain size based on said stored random operator based equality chain;
determining an element size based on said random operator based equality-chain;
determining an index pair 0 based on said stored random operator based equality chain;
determining a seed element based on said stored random operator based equality chain, said chain size, and said element size;
making said seed element a part of said game session matrix based on said index pair 0;
determining an index pair 1 of a plurality of index pairs based on said stored near equality chain;
determining an operator byte based on said stored random operator based equality chain;
determining a data nibble based on said stored random operator based equality chain;
determining a byte of a byte sequence of a plurality of byte sequences based on said data nibble and said operator byte; and
making said plurality of byte sequences a part of said game session matrix based on said plurality of index pairs and said element size.

\* \* \* \* \*